(12) United States Patent
Kurose et al.

(10) Patent No.: US 6,679,962 B2
(45) Date of Patent: Jan. 20, 2004

(54) METHOD FOR FABRICATING POWER TRANSMISSION BELT INCLUDING GRINDING WITH SPECIFIED GRINDING WHEEL

(75) Inventors: Yoshitaka Kurose, Kobe (JP); Kazuyoshi Tani, Kobe (JP); Koji Watanabe, Kobe (JP)

(73) Assignee: Bando Chemical Industries, Ltd., Hyogo (JP)

( * ) Notice: Subject to any disclaimer, the term of this patent is extended or adjusted under 35 U.S.C. 154(b) by 343 days.

(21) Appl. No.: 09/932,967

(22) Filed: Aug. 21, 2001

(65) Prior Publication Data

US 2001/0056003 A1 Dec. 27, 2001

Related U.S. Application Data

(62) Division of application No. 09/574,066, filed on May 18, 2000, now Pat. No. 6,435,997.

(30) Foreign Application Priority Data

May 24, 1999  (JP) ............................................. 11-143613
May 24, 1999  (JP) ............................................. 11-143618

(51) Int. Cl.[7] ......................... B29D 29/00; B29D 29/08; F16G 1/10; F16G 1/28; F16G 5/08; F16G 5/20
(52) U.S. Cl. ........................ 156/137; 156/154; 264/162; 451/28; 474/263
(58) Field of Search ........................... 474/263; 428/67, 428/85, 86, 88–90, 92, 95, 96; 451/28; 156/154, 137, 153, 138–142; 264/162

(56) References Cited

U.S. PATENT DOCUMENTS

| | | | | |
|---|---|---|---|---|
| 5,335,456 A | * | 8/1994 | Mishima | |
| 5,549,510 A | * | 8/1996 | Fukuda et al. | 264/162 X |
| 5,595,533 A | * | 1/1997 | Kumazaki | |
| 5,738,571 A | * | 4/1998 | Kitahama et al. | |
| 2002/0004434 A1 | * | 1/2002 | Tani et al. | 474/263 |
| 2002/0004435 A1 | * | 1/2002 | Tani et al. | 474/263 |

FOREIGN PATENT DOCUMENTS

| | | |
|---|---|---|
| JP | 62-113940 A | 5/1987 |
| JP | 3-219147 | 9/1991 |
| JP | 3-265741 | 11/1991 |
| JP | 7-4470 | 1/1995 |
| JP | 7-98044 | 4/1995 |
| JP | 7-151191 | 6/1995 |
| JP | 7-269658 | 10/1995 |
| JP | 7-280040 A | 10/1995 |
| JP | 09-267248 | 10/1997 |
| JP | 10-329029 A | 12/1998 |

OTHER PUBLICATIONS

Notice of Reasons (with Translation) Dated Jan. 21, 2003 from the Japanese Patent Office.

* cited by examiner

Primary Examiner—Adrienne C. Johnstone
(74) Attorney, Agent, or Firm—Nixon Peabody, LLP

(57) ABSTRACT

Extruded sections of synthetic fibers extruded from a side face of each rib in a V-ribbed belt are plastically deformed in the shape of sectors gradually broadened toward their distal ends. The extruded sections of the synthetic fibers are not heated beyond their melting point during a grinding process so as to be kept unmelted. The extruded sections of the synthetic fibers are raised from the side face of the rib so that microscopic unevenness is formed over the side face of the rib. The synthetic fiber is formed of nylon with a filament diameter of 20 $\mu$m or more.

3 Claims, 13 Drawing Sheets

METHOD FOR FABRICATING POWER TRANSMISSION BELT INCLUDING GRINDING WITH SPECIFIED GRINDING WHEEL

BACKGROUND OF THE INVENTION

This invention relates to a power transmission belt and method for fabricating the same, and particularly relates to a power transmission belt such as a V-ribbed belt or a V-belt including short fibers mixed into its compression rubber and a method for fabricating the same.

As disclosed in, for example, Japanese Patent Application Laid-Open Gazette No. 3-219147, there are conventionally known power transmission belts in which a crowd of short fibers are mixed into their compression rubber in a manner to be oriented along the width of the belt and some of the short fibers are extruded from the surface of the compression rubber. Power transmission belts of such kind aim at enhancing bearing strengths and wearing properties of their friction drive sections and preventing noise production during their running.

However, even such a power transmission belt out of which some of the short fibers extrude, if the total area of extruded sections of the short fibers occupying the surface of the compression rubber is small, cannot enhance its wearing property so much because the area of the compression rubber in direct contact with a pulley becomes correspondingly large.

For the purpose of increasing the exposure areas of short fibers, the power transmission belt disclosed in the above gazette has proposed to set the process temperature in grinding at a higher temperature so as to melt tips of short fibers by heat produced in grinding. In this manner, as shown in FIG. 17, an exposure section 101 of each short fiber 100 is formed as if a flower blooms, resulting in increased exposure area of the short fiber 100.

However, when melted, a short fiber changes its molecular structure and therefore deteriorates its strength. Accordingly, though the above conventional power transmission belt is increased in exposure area, it is difficult to say that the belt is sufficiently enhanced in wearing property.

Furthermore, if the length for which the short fiber is extruded from the surface of the compression rubber is too large in order to increase the exposure area, the belt will largely change its properties when the extruded sections of the short fibers are reduced by abrasion. Therefore, considering to maintain desired belt properties constant for a long time, there is a limit to increasing the extruded length of the short fiber. Accordingly, it has been desired to make great strides in enhancing the performance of the belt by improving not only short fibers but also the compression rubber.

In view of these problems, an object of the present invention is to enhance the wearing property of the belt by increasing the exposure area of each short fiber while ensuring the strength of thereof.

Another object of the present invention is to further enhance the performance of the belt by improving the surface configuration of the compression rubber.

SUMMARY OF THE INVENTION

To attain the above first object, a power transmission belt of the present invention is constructed so that short fibers are plastically deformed into flat form.

More specifically, a power transmission belt of the present invention is directed to a power transmission belt in which a crowd of short fibers are mixed into a compression rubber there of in a manner to be oriented in a given direction and some of the short fibers each have an extruded section extruded from a surface of the compression rubber, and is characterized in that the extruded section of the short fiber is formed into flat shape by plastic deformation.

With this construction, since the extruded section of the short fiber is not melted, it can retain intrinsic strength. Furthermore, since the extruded section of the short fiber is plastically deformed by an external force into flat form, it has a larger exposure area than that of circular cross section. As a result, the belt can enhance wearing property. Thus, since the extruded section of the short fiber is formed into flat shape by plastic deformation, it can retain intrinsic strength and ensure a large exposure area, resulting in enhanced wearing property of the belt.

The extruded section of the short fiber is preferably formed in a sector gradually broadened toward a distal end thereof.

With this construction, the extruded section of the short fiber can obtain a specific flat configuration of large exposure area.

Meanwhile, in the above conventional belt, since the extruded short fibers are easy to fall to the surface of the compression rubber, they are difficult to together form surface unevenness as considered as effectively suppressing noise. Therefore, the conventional belt is likely to produce noise.

To cope with this problem, the extruded sections of the short fibers are preferably raised at root portions thereof from the surface of the compression rubber. With this construction, microscopic unevenness is formed over the surface of the compression rubber so that the raised root portion of each extruded section constitutes a microscopic convexity and a rubber surface region adjoining a place where each extruded short fiber is implanted in the compression rubber constitutes a microscopic concavity, thereby suppressing the occurrence of noise.

The short fiber is preferably formed of a synthetic fiber with a filament diameter of20 $\mu$m or more. This provides a suitable short fiber for exerting the above effect of suppressing noise.

To attain the above second object, a power transmission belt of the invention is constructed so that unevenness is provided in the surface of the compression rubber to increase its entire surface area.

Specifically, in the power transmission belt, the surface of the compression rubber is preferably formed in uneven configuration.

With this construction, since the surface of the compression rubber is formed unevenly, its entire surface area can be increased. This enhances the performance of the belt. In addition, clearances are likely to be formed between contact surfaces of the belt and a pulley. Accordingly, even if water or the like enters between the belt and pulley, it can be distributed or discharged through the clearances, which stabilizes the frictional resistance of the belt.

The surface unevenness of the compression rubber is preferably formed in wavy shape. Thereby, a suitable uneven configuration can be formed in the surface of the compression rubber.

The surface unevenness of the compression rubber is preferably formed to have a level difference of 0.5 to 10 $\mu$m. Also in this case, a suitable uneven configuration can be formed in the surface of the compression rubber.

A method for fabricating a power transmission belt of the present invention is directed to a method for fabricating a power transmission belt in which some of a crowd of non-aramid synthetic fibers are extruded from a surface of a compression rubber, and is characterized by comprising the step of grinding the compression rubber into which the crowd of non-aramid synthetic fibers are mixed in a manner to be oriented in a given direction with a grinding wheel having super abrasives extruded for 50 to 95% in grain size thereof from the surface of the grinding wheel.

According to this method, the extruded non-aramid synthetic fibers are inclined in a grinding direction by interference with the super abrasives and then plastically deformed one after another, as they are released from stresses induced in their surfaces by interference with the super abrasives, so as to be bowed and formed into flat shape as gradually broadened toward their distal ends while being partly pulled apart at their distal ends. Further, since the height of extrusion of each of the super abrasives is large, a bonding part for the super abrasives in the grinding wheel is prevented from direct contact with the compression rubber of the power transmission belt, there by suppressing production of frictional heat. Therefore, the extruded sections of the non-aramid synthetic fibers are not heated so much during grinding so as to be prevented from being melted. In other words, it can be facilitated to plastically deform the non-aramid synthetic fibers and extrude them from the surface of the compression rubber while keeping them unmelted. Accordingly, a power transmission belt in which extruded sections of non-aramid synthetic fibers are plastically deformed can be easily obtained. In addition, such a large height of extrusion of the super abrasive can facilitate to form the surface of the compression rubber into uneven configuration.

Another method for fabricating a power transmission belt of the present invention is also directed to a method for fabricating a power transmission belt in which some of a crowd of non-aramid synthetic fibers are extruded from a surface of a compression rubber, and is characterized by comprising the step of grinding the compression rubber into which the crowd of non-aramid synthetic fibers are mixed in a manner to be oriented in a given direction with a grinding wheel having super abrasives the density of which is 3.5 to 55%.

According to this method, since the density of the super abrasives is small, chip pockets can be increased so that grinding chips can be readily expelled. Therefore, clogging between the abrasives due to the chips is difficult to occur. This suppresses heat production during grinding. Accordingly, a power transmission belt in which extruded sections of non-aramid synthetic fibers are kept unmelted and plastically deformed can be easily obtained. In other words, it can be facilitated to plastically deform the non-aramid synthetic fibers and extrude them from the surface of the compression rubber while keeping them unmelted. In addition, such a small density of the super abrasives can facilitate to form the surface of the compression rubber into uneven configuration.

Still another method for fabricating a power transmission belt of the present invention is also directed to a method for fabricating a power transmission belt in which some of a crowd of non-aramid synthetic fibers are extruded from a surface of a compression rubber, and is characterized by comprising the step of grinding the compression rubber into which the crowd of non-aramid synthetic fibers are mixed in a manner to be oriented in a given direction with a grinding wheel having super abrasives which are each extruded for 50 to 95% of grain size thereof from the surface of the grinding wheel and the density of which is 3.5 to 55%.

According to this method, since the height of extrusion of each of the super abrasives is large, a bonding part for the super abrasives in the grinding wheel is prevented from direct contact with the compression rubber of the power transmission belt, there by suppressing production of frictional heat. Further, since the density of the super abrasives is small, chip pockets are large in size so that grinding chips can be readily expelled. Therefore, clogging between the abrasives due to the chips is prevented. This suppresses heat production during grinding. Accordingly, a power transmission belt in which extruded sections of non-aramid synthetic fibers are kept unmelted and plastically deformed can be easily obtained. In other words, it can be facilitated to plastically deform the non-aramid synthetic fibers and extrude them from the surface of the compression rubber while keeping them unmelted. In addition, it can be facilitated to form the surface of the compression rubber into uneven configuration.

DESCRIPTION OF THE PREFERRED EMBODIMENTS

Hereinafter, embodiments of the present invention will be described with reference to the drawings.

Embodiment 1

Figure 1:
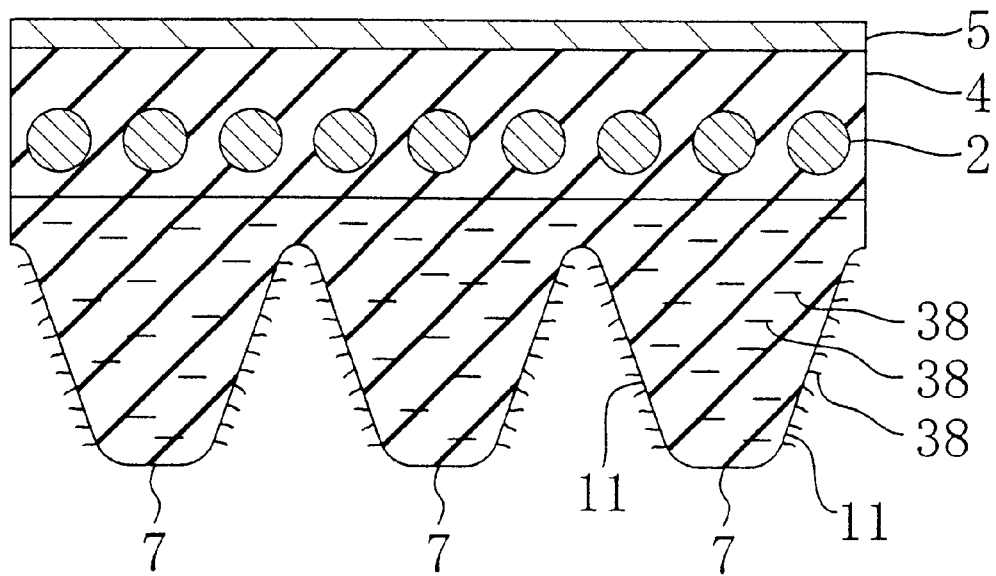
FIG. 1 is a cross-sectional view of a V-ribbed belt according to Embodiment 1 of the present invention.

FIG. 1 shows a cross section of a power transmission belt 10 according to Embodiment 1 of the present invention. The power transmission belt 10 is a V-ribbed belt used for automotive engine auxiliary driving devices or other general industrial applications.

A tension member 2 extending along the length of the belt 10 is embedded in an adhesion rubber layer 4 in a manner to be arranged at regular intervals along the width of the belt 10 (in the lateral direction of FIG. 1). A fabric layer 5 is provided on the upper face side of the adhesion rubber layer 4, i.e., on the back face side of the belt 10. A plurality of ribs 7,7, . . . are provided along the width of the belt 10 on the lower face side of the adhesion rubber layer 4, i.e., on the bottom face side of the belt 10, to extend along the length of the belt 10. The plurality of ribs 7,7, . . . correspond to a "compression rubber" to which reference has been made in this description. The adhesion rubber layer 4 and the ribs 7 may be made of, for example, chloroprene rubber, H-NBR rubber, CSM rubber, natural rubber, SBR rubber, butadiene rubber, EPM or EPDM.

A plurality of synthetic fibers 38, 38, . . . are embedded in each of the ribs 7, 7, . . . while maintaining their orientation to a given direction. Particularly in this invention, the synthetic fibers 38, 38, . . . are embedded in each of the ribs 7,7, . . . while maintaining their orientation to the belt widthwise direction. For the synthetic fiber 38, suitable use can be made of a plastically deformable fiber, such for example as nylon, vinylon or polyester, with a filament diameter of 20 μm or more.

Figure 2:
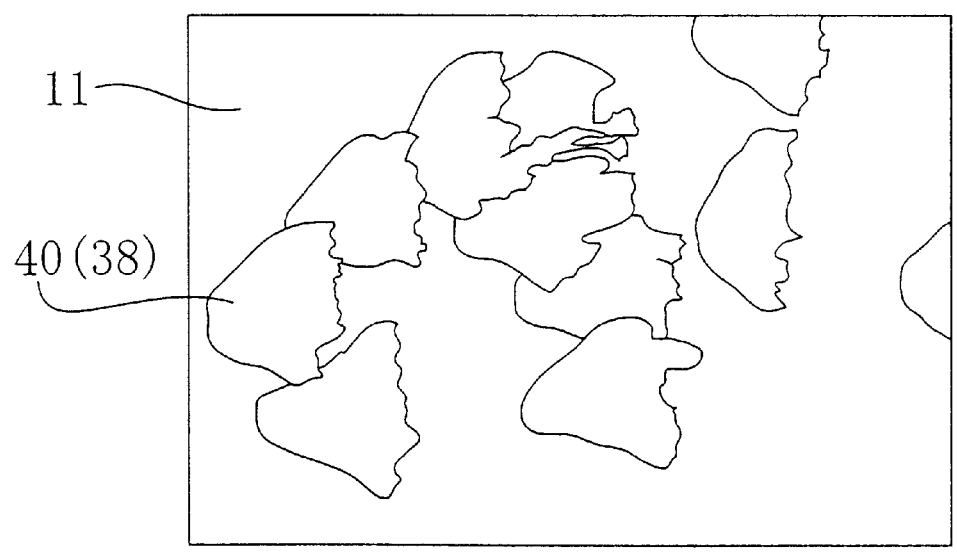
FIG. 2 is an enlarged view showing the surface of a rib of the V-ribbed belt according to Embodiment 1.
Figure 3:
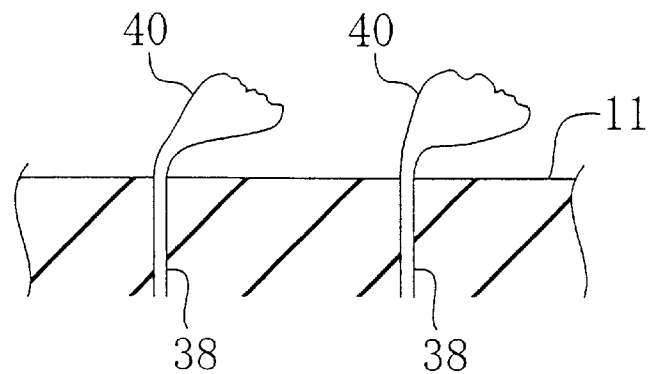
FIG. 3 is an enlarged cross-sectional view showing the vicinity of the surface of the rib in the V-ribbed belt according to Embodiment 1.

As shown in FIGS. 2 and 3, some of the synthetic fibers 38, 38, . . . embedded in each of the ribs 7 are extruded from a side face 11 of the rib 7. The extruded section 40 of the synthetic fiber 38 is formed in a sector gradually flattened and broadened toward its distal end. The corners of the sector are rounded to present gently curved surfaces. Also, the extruded section 40 of the synthetic fiber 38 is kept unmelted and formed at its distal end in the shape of waves.

As shown in FIG. 3, the root portion of the extruded section 40 of the synthetic fiber 38 is raised from the side face 11 of the rib 7. In other words, the extruded fiber section 40 is in substantially upright position with respect to the side face 11 of the rib 7. As a result, microscopic unevenness is formed over the side face 11 of the rib 7 in such a manner that the extruded sections 40 of the synthetic fibers 38 constitute microscopic convexities and surface regions of the rib 7 adjoining places where the extruded short fibers 38 are implanted constitute microscopic concavities. The length of the extruded section 40 is, for example, a length of between 5 and 30 μm.

Fabricating Method of V-ribbed Belt

A method for fabricating the V-ribbed belt 10 will be described next.

First, an unvulcanized rubber sheet for constituting the adhesion rubber layer 4, a cord for constituting the tension member 2 and another unvulcanized rubber sheet into which synthetic fibers 38 are mixed are stacked in this order, and these elements are hot cured thereby obtaining a molded form of belt in cylindrical shape.

Figure 4:
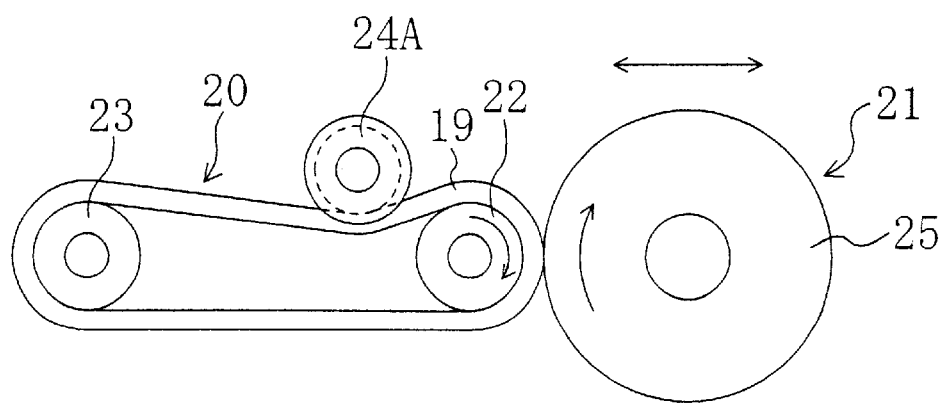
FIG. 4 is a view showing the structure of a grinding apparatus for a V-ribbed belt.

Then, as shown in FIG. 4, the molded form of belt 19 is entrained around main and tension rolls 22, 23 of a drive mechanism 20 and is run by this drive mechanism 20. In the figure, the reference numeral 24A denotes a guide roll. Next, the running molded form of belt 19 is pressed against a grinding wheel 21 driven into rotation thereby grinding the molded form of belt 19. In this manner, some of the synthetic fibers 38 embedded in the molded form of belt 19 are extruded in flattened forms from a side surface 11 of each rib 7. Specifically, the extruded synthetic fibers 38 are inclined in a grinding direction by interference with abrasives and then plastically deformed one after another, as they are released from stresses induced in their surfaces by interference with the abrasives, so as to be bowed and formed into flat shape as gradually broadened toward their distal ends while being partly pulled apart at their distal ends.

During this grinding process, the extruded section 40 of the synthetic fiber 38 can be adjusted in its degree of flatness and its shape of waves at the distal end by controlling the type or pressing force of the grinding wheel 21.

Figure 5A:
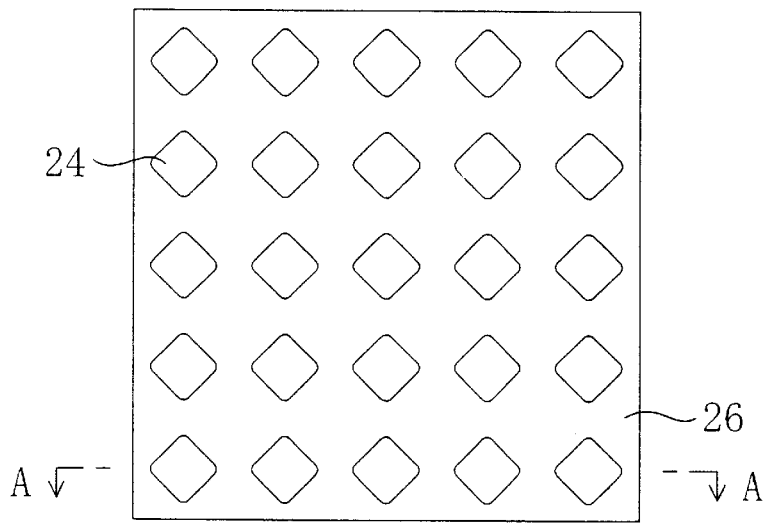
FIG. 5(a) is a partly enlarged plan view showing the periphery of a grinding wheel and FIG. 5(b) is a cross-sectional view taken along the line A—A of FIG. 5(a).
Figure 5B:
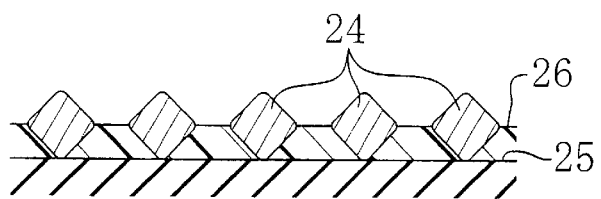

For the grinding wheel 21, use is preferably made of a construction in which diamond abrasives 24 are fixed on the periphery of a disk-like wheel 25 by electroplating, brazing, baking or the like. However, abrasives in the present invention is not limited to diamond abrasives but may be other super abrasives made of, for example, cubic boron nitride (CBN) FIG. 5(a) is a partly vertical projection of the periphery of the wheel 25, and FIG. 5(b) is a cross-sectional view taken along the line A—A of FIG. 5(a). As shown in these FIGS. 5(a) and 5(b), bond (such as metal bond or nickel bond) is spread and coated in a thin layer on the periphery of the wheel 25 (see FIG. 4) to form a bonding part 26.

The diamond abrasives 24 are distributed uniformly in and adhered to the bonding part 26. The grain size of the abrasive 24 is set preferably in the range of #30 to #200, and at #140 in this embodiment. The height of extrusion of each abrasive 24 is set preferably at 50 to 95% of its entire height, and at 80% thereof in this embodiment. The density of the abrasives 24 (the rate at which the total surface area of the abrasives occupies with respect to the entire grinding surface area) is set preferably in the range of 3.5 to 55%, and at 45% in this embodiment.

The rotation of the wheel 25 in the grinding process is made preferably at a peripheral speed of between 500 and 2000 m/min, and at a peripheral speed of 1000 m/min in this embodiment. The grinding speed ratio Vs/Vw, which is a ratio of the peripheral speed Vs of the grinding wheel 21 to the peripheral speed Vw of the belt 19, is set preferably in the range of 0.002 to 0.04, and at 0.004 in this embodiment.

Effects of this Embodiment

As can be seen from the above, in the V-ribbed belt 10 of this embodiment, since the extruded section 40 of the synthetic fiber 38 is formed into flat shape, the total surface area of the extruded synthetic fibers 38 is greater than that of extruded synthetic fibers of circular section with respect to the area of the side face 11 of the rib 7. In addition, since the extruded section 40 of the synthetic fiber 38 is formed at its distal end in the shape of waves, the total surface of the extruded synthetic fibers 38 is greater than that of the equivalents formed in simple flat shapes at their distal ends. Accordingly, the V-ribbed belt 10 have large wearing property.

Since the extruded sections 40 of the synthetic fibers 38 are kept unmelted through plastic deformation, they retain intrinsic strengths. Accordingly, the extruded sections 40 of the synthetic fibers 38 are resistant to abrasion so that the belt 10 can be further enhanced in wearing property.

Since the extruded section 40 of the synthetic fiber 38 is formed in a rounded sector, the belt 10 can attain stable frictional resistance even if bearing stress on the side face 11 of the rib 7 is large or uneven.

Since the root portions of the extruded sections 40 of the synthetic fibers 38 are raised from the side face 11 of the rib 7, water or oil entering between frictional surfaces of the belt and a pulley can be readily discharged through clearances between the root portions of the extruded sections 40. Therefore, even if water or the like enters between the frictional surfaces of the belt and the pulley, the belt is stable in frictional resistance.

Since grinding the rib 7 is made using a grinding wheel with super abrasives each extruded for 50 to 95% of their grain size from the bonding part 26, a contact between the boding part 26 and the rib 7 is hard to occur during grinding. Therefore, an amount of heat produced by friction is small. Further, since the abrasives 24 are made of diamond of relatively high heat conductivity, heat produced during grinding can be easily escaped to the wheel 25. Accordingly, the extruded sections 40 of the synthetic fibers 38 do not rise in temperature to such a degree (melting point) as melting but are kept unmelted.

Since the density of super abrasives is relatively as low as 3.5 to 55%, clearances between the abrasives, i.e., chip pockets, are large in size. Therefore, clogging between the abrasives due to the chips is difficult to occur during grinding. Accordingly, heat production due to such clogging can be suppressed, which facilitates to keep the extruded sections 40 of the synthetic fibers 38 unmelted.

Performance Comparison

Next, description will be made about a performance comparison test for comparing performances of the V-ribbed belt 10 in this embodiment and the prior-art V-ribbed belt. In the test, 20 to 25 phr of Nylon was used as synthetic fibers 38 for the V-ribbed belt 10. As the prior-art V-ribbed belt, use was made of a V-ribbed belt in which an exposed section of each short fiber was melted as if a flower bloomed.

Figure 6:
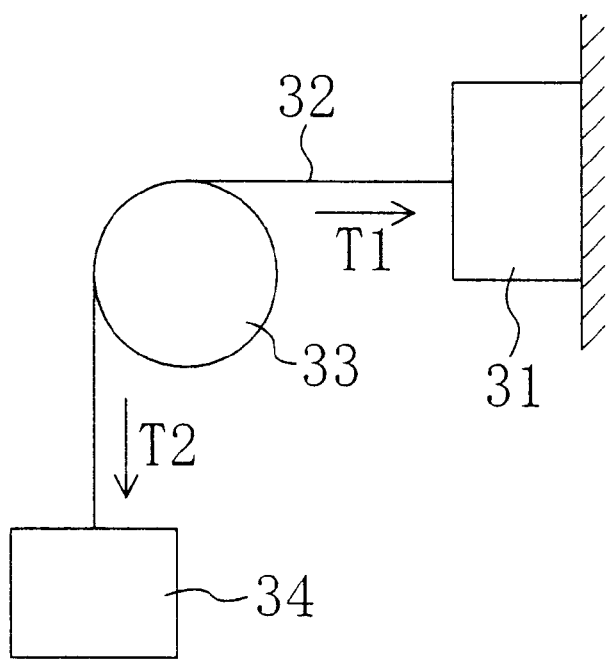
FIG. 6 is a view showing the structure of a testing device for a performance comparison test.

The test was conducted as follows. Specifically, a weight weighing W was suspended from a load cell 31 through a guide roller 33 by a sample belt 32 as shown in FIG. 6, respective tensions T1 and T2 at tight and slack sides of the belt 32 were measured by detecting a value of the load cell 31, and changes of the ratio (tension ratio) T1/T2 with time were determined. It is to be noted that the tension ratio T1/T2 provides an indication of the coefficient of friction $\mu=(1/\pi) \ln (T1/T2)$. The speed of rotation of the guide roller 33 was set at 43 rpm. The weight W was set at 1.75 kg.

Figure 7:
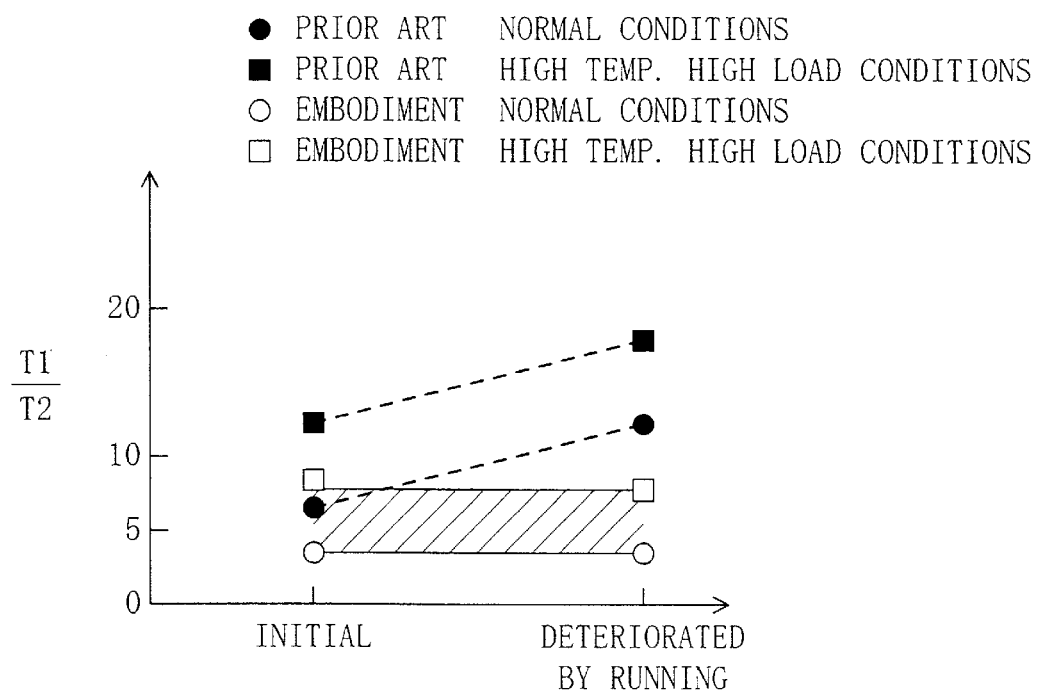
FIG. 7 is a graphic representation of performance comparison of inventive and prior-art V-ribbed belts with reference to variations in tension ratio.

As shown in FIG. 7, the test results showed that the V-ribbed belt 10 in this embodiment was substantially constant in tension ratio T1/T2 between the initial (brand-new) condition and the condition having been continuously run for 24 hours (deteriorated by running) and significantly decreased variations of the tension ratio T1/T2 as compared with the prior-art belt. Further, the same measurement was conducted on both the belts under the conditions of high temperature of 100° C. and high load. The results of this measurement showed that the prior-art belt significantly increased the tension ratio T1/T2 as compared with under normal conditions, whereas the V-ribbed belt 10 in this embodiment barely increased the tension ratio T1/T2 and was small in changes of the tension ratio T1/T2 with time as compared with prior-art belt. The main reason for these seems that the short fiber in the prior-art V-ribbed belt is rapidly worn from its melted portion to significantly decrease its surface area, whereas in the V-ribbed belt 10 of this embodiment, the extruded section 40 of the synthetic fiber 38 is kept unmelted and therefore retains the strength of the synthetic fiber 38 even under the conditions of high temperature and high load thereby barely decreasing the surface area of the synthetic fiber 38.

Figure 8:
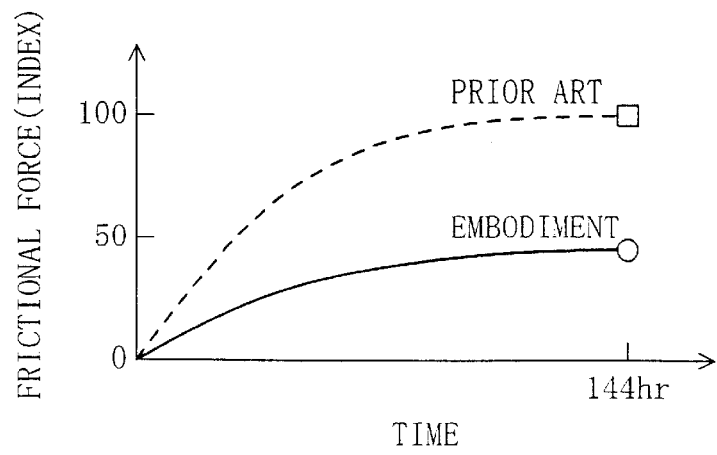
FIG. 8 is a graphic representation of performance comparison of the inventive and prior-art V-ribbed belts with reference to variations in frictional force of rubber.

FIG. 8 shows changes in frictional force of rubber with time under the conditions of high temperature of 100° C. It can be seen from FIG. 8 that the V-ribbed belt 10 in this embodiment is smaller in changes in frictional force of rubber with time than the prior-art belt.

Embodiment 2

Figure 9:
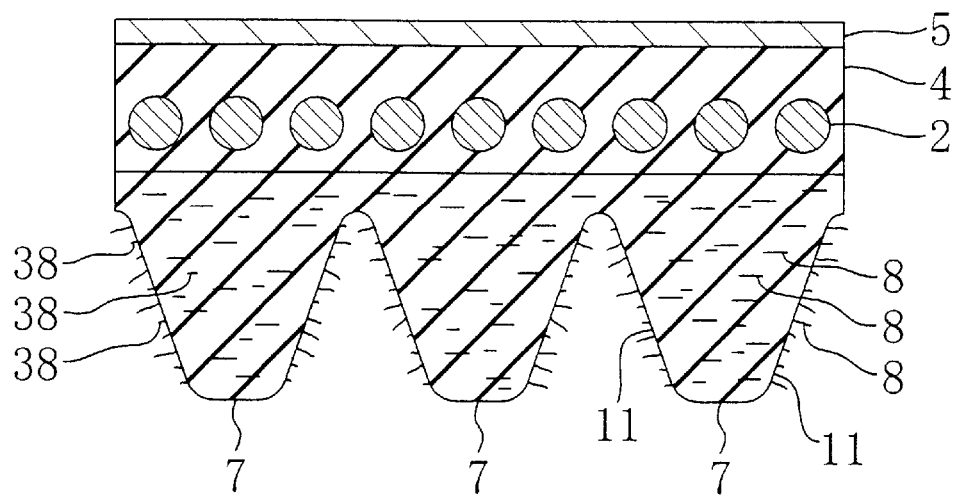
FIG. 9 is a cross-sectional view of a V-ribbed belt according to Embodiment 2 of the present invention.

FIG. 9 shows a cross section of a power transmission belt 10 according to Embodiment 2 of the present invention.

In this embodiment, a plurality of short aramid fibers 8, 8, . . . and a plurality of non-aramid synthetic fibers 38, 38, . . . are mixed into each of ribs 7 while maintaining their orientation to a given direction. Particularly in this embodiment, short aramid fibers 8 and non-aramid synthetic fibers 38 are embedded into the ribs 7 while maintaining their orientation to a belt widthwise direction (lateral direction in FIG. 9).

The short aramid fiber 8 may be made of a para-aramid or meta-aramid fiber. In other words, poly-para-phenyleneterephthalamide or poly-meta-phenyleneisophthalamide is suitably applicable for the short aramid fiber 8. More specifically, Kevlar (trademark of E. I. Du Pont de Nemours & Co.), Technora (trademark of Teijin Ltd.), Twaron (trademark of Enka B. V.) or the like may be suitably used as a para-aramid fiber. Conex (trademark of Teijin Ltd.), Nomex (trademark of E. I. Du Pont de Nemours & Co.) or the like may be suitably used as a meta-aramid fiber.

Figure 10:
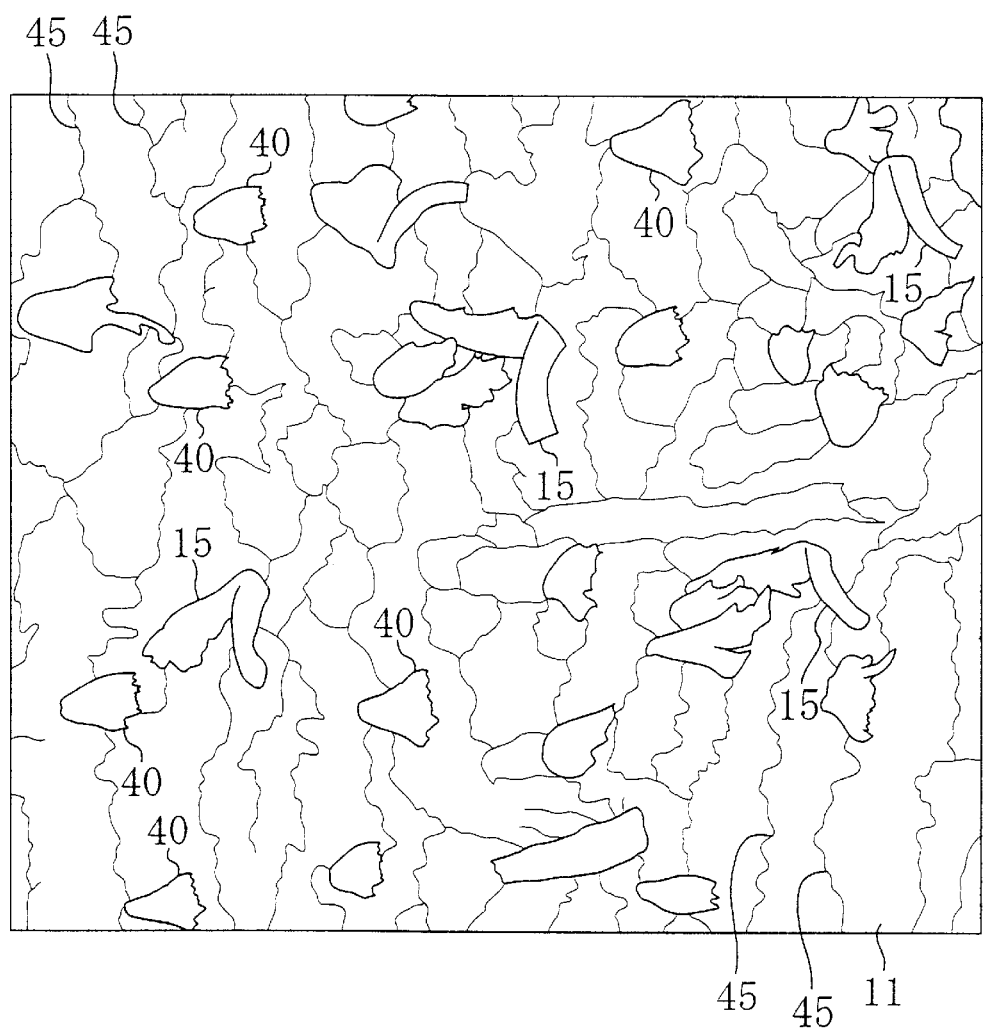
FIG. 10 is an enlarged view of the surface of a rib in the V-ribbed belt according to Embodiment 2.
Figure 11:
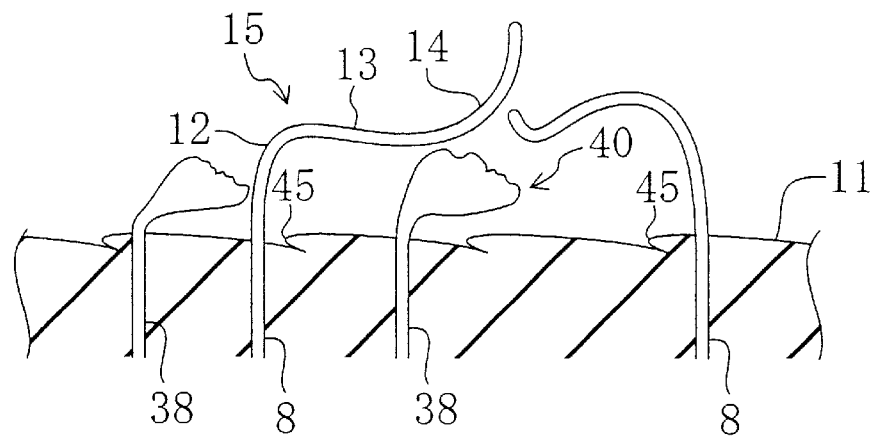
FIG. 11 is an enlarged cross-sectional view showing an example of the vicinity of the surface of the rib in the V-ribbed belt according to Embodiment 2.
Figure 12:
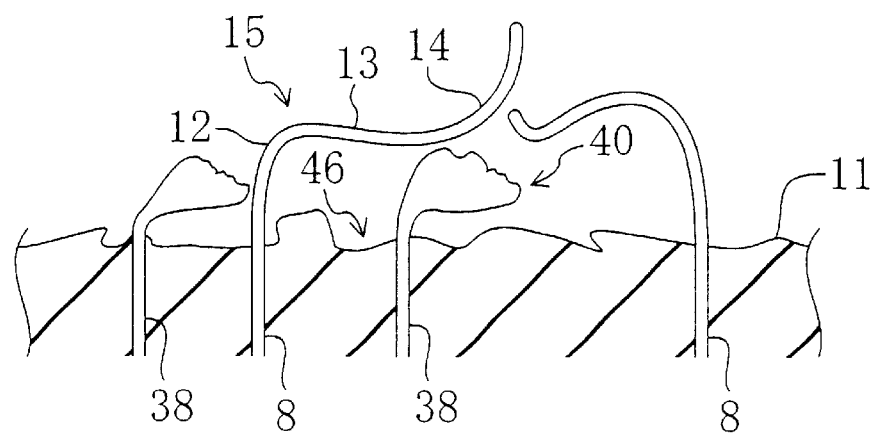
FIG. 12 is an enlarged cross-sectional view showing another example of the vicinity of the surface of the rib in the V-ribbed belt according to Embodiment 2.

As shown in FIGS. 10 and 11, microscopic unevenness (for example, with a level difference of 0.5 to 10 μm) is formed in a surface 11 of each rib 7. In this embodiment, the surface unevenness of the rib is formed in such a configuration that a plurality of waves are traveled in a single direction by a wind, i.e., in wavy shape. However, it goes without saying that the surface unevenness of the rib in the present invention is not limited to such wavy shape but may be an uneven configuration 46 in which peaks and valleys are alternately disposed as shown in FIG. 12 or other uneven configurations.

As shown in FIGS. 10 and 11, some of the crowd of short aramid fibers 8, 8, . . . embedded in each of the ribs 7 are extruded from the surface 11 of the rib 7. An extruded section 15 of each short aramid fiber 8 is bowed to increase its apparent surface area per unit extruded height. Further, the extruded sections 15, 15, . . . of the short aramid fibers 8, 8, . . . are bowed not in the same direction but randomly in multiple directions. Since the extruded fiber sections 15, 15, . . . are thus bowed in various directions to decentralized their orientation, the bearing strength and wearing property of the V-ribbed belt 10 are enhanced uniformly in every direction. Accordingly, the V-ribbed belt 10 is independent of its running direction and can exhibit uniform performance in either running direction.

As shown in FIG. 11, the root portion 12 of the extruded section 15 of the short aramid fiber 8 is raised from the side face 11 of the rib 7. In other words, the root portion 12 of the extruded fiber section 15 is in substantially upright position with respect to the side face 11 of the rib 7. The medial portion 13 of the extruded fiber section 15 is bowed from the end of the root portion 12. The tip portion 14 of the extruded fiber section 15 is bowed in a direction different from the bowing direction of the medial portion 13. For example, in the short aramid fiber 8 shown in FIG. 11, the tip portion 14 is bowed in a direction opposite to the bowing direction of the medial portion 13. Namely, the extruded short aramid fiber 8 is formed in such a curled shape as bowed first in a certain direction and then opposite direction on its way from root to tip. As a result, the extruded section 15 of the short aramid fiber 8 is kept elevated above the side face 11 of the rib 7. Accordingly, the short aramid fiber 8 can exert a restoring force like a leaf spring in association with its curled shape.

By pressure (mechanical force) from a grinding wheel 21 during a grinding process described later, some of the extruded sections 15, 15, . . . of the short aramid fibers 8, 8, . . . are flattened and others are cracked at the tips thereof.

Some of the synthetic fibers 38, 38, . . . embedded in each of the ribs 7 are also extruded from the side face 11 of the rib 7. However, extruded sections 40, 40, . . . of the synthetic fibers 38, 38, . . . are inclined in a given direction unlike the extruded sections 15, 15, . . . of the short aramid fibers 8, 8, . . . Specifically, each of the extruded sections 40 is inclined in a direction opposed to wave fronts 45 in the wavy-shaped side face 11 of each rib 7. And, the extruded section 40 of the synthetic fiber 38 is formed in a sector gradually flattened and broadened toward its distal end. The corners of the sector are rounded to present gently curved surfaces. Also, the extruded section 40 of the synthetic fiber 38 is kept unmelted and formed at its distal end in the shape of waves.

As shown in FIG. 11, the root portion of the extruded section 40 of the synthetic fiber 38 is likewise raised from the side face 11 of the rib 7. As a result, microscopic unevenness can be also formed over the surface of the rib 7 so that the extruded sections 15, 40 of short aramid fibers 8 and synthetic fibers 38 constitute microscopic convexities and surface regions of the rib 7 adjoining places where the short fibers 8, 38 are implanted constitute microscopic concavities, separately from the microscopic unevenness formed in the side face 11 of the rib 7.

Fabricating Method of V-ribbed Belt

The V-ribbed belt 10 in this embodiment is fabricated in the following manner.

First, an unvulcanized rubber sheet for constituting a adhesion rubber layer 4, a cord for constituting a tension member 2 and another unvulcanized rubber sheet into which short aramid fibers and synthetic fibers are mixed are stacked in this order, and these elements are hot cured thereby obtaining a molded form of belt in cylindrical shape.

Then, in the same manner as in Embodiment 1 (see FIG. 4), the molded form of belt 19 is entrained around main and tension rolls 22, 23 of a drive mechanism 20 and is run by this drive mechanism 20. Next, the running molded form of belt 19 is pressed against a grinding wheel 21 driven into rotation thereby grinding the molded form of belt 19. In this case, the short aramid fibers 8 are hardly cut off because of its large greige tensile modulus and some of them are extruded for relatively large lengths from the side faces 11 of the ribs 7. Further, some of the synthetic fibers 38 are extruded in positions inclined reversely to the belt running direction. Specifically, each of the extruded short aramid fibers 8 and synthetic fibers 38 is released from stress inducedin its surface by interference with abrasives thereby plastically deforming. Then, the surface of each rib 7 is formed into an uneven configuration in the shape of waves such that their wave fronts 45 are directed to the direction of rotation of the grinding wheel 21.

During this grinding process, the extruded configurations of the short aramid fiber 8 and synthetic fiber 38 and the uneven surface configuration of the rib 7 can be adjusted by controlling the type or pressing force of the grinding wheel 21. In this embodiment, grinding is made under the same conditions and with the same grinding wheel 21 as used in Embodiment 1.

Effects of this Embodiment

According to the V-ribbed belt 10 in this embodiment as described above, since microscopic unevenness is formed in the side face 11 of each rib 7, the surface area of the rubber portion of the rib 7 is large. This enables to reduce bearing stress on the surface of the rubber portion. Accordingly, wear of the rubber portion can be suppressed, resulting in improved friction property and elongated life time of the belt.

If water or oil enters between a pulley and a belt, the frictional resistance of the belt generally becomes unstable. In the V-ribbed belt 10 of this embodiment, however, microscopic unevenness is formed over the side face 11 of each rib 7. Accordingly, microscopic clearances are formed between the belt and a pulley. Therefore, water or the like is distributed among the clearances and then readily discharged through the clearances, which stabilizes frictional resistance of the belt.

Since the short aramid fibers 8 and synthetic fibers 38 are extruded from the side face 11 of each rib 7, the rib 7 itself is hardly worn and its surface is hardly flattened. Accordingly, the belt can exhibit for a long time the above effects obtained by forming the rib surface into uneven configuration.

Further, each rib 7 has unevenness in the side face 11 itself. Therefore, even if the rib 7 itself is worn due to extended periods of use, the belt can be expected to continue to exhibit the above effects unless the uneven surface has been worn out into flatness. Accordingly, the V-ribbed belt 10 in this embodiment can retain its high performance for a long time.

Performance Comparison

Figure 13:
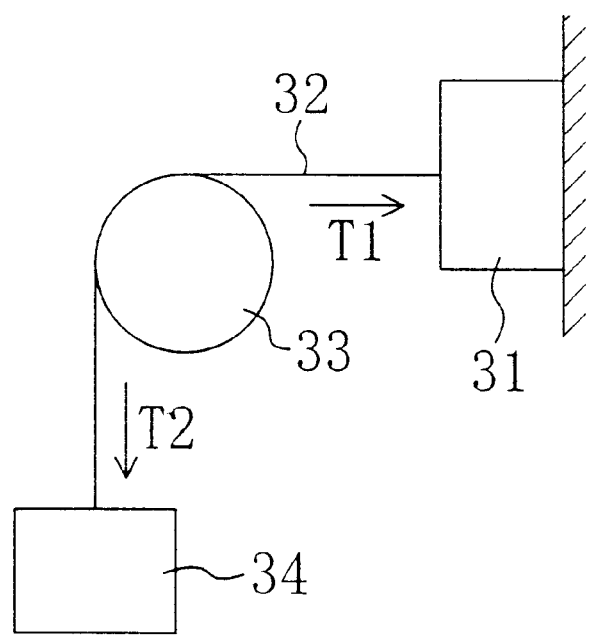
FIG. 13 is a view showing the structure of a testing device for a performance comparison test.

Next, description will be made about a performance comparison test for comparing performances of the V-ribbed belt 10 in this embodiment and a V-ribbed belt (comparative example) in which the side face 11 of each rib 7 is formed with no unevenness. In this test, a weight weighing W was suspended from a load cell 31 through a guide roller 33 by a sample belt 32 as shown in FIG. 13, respective tensions T1 and T2 at tight and slack sides of the belt 32 were measured by detecting a value of the load cell 31, and a frictional force of the belt 32 was determined from the ratio (tension ratio) T1/T2.

Figure 14:
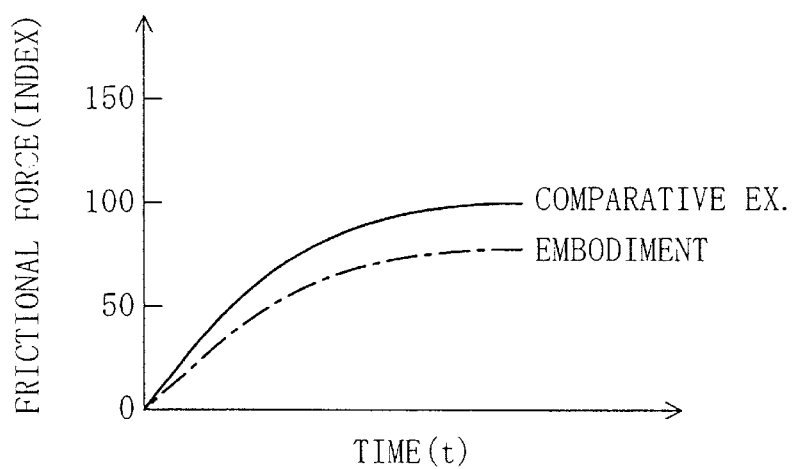
FIG. 14 is a graphic representation of performance comparison of inventive and comparative V-ribbed belts with reference to frictional forces.
Figure 15:
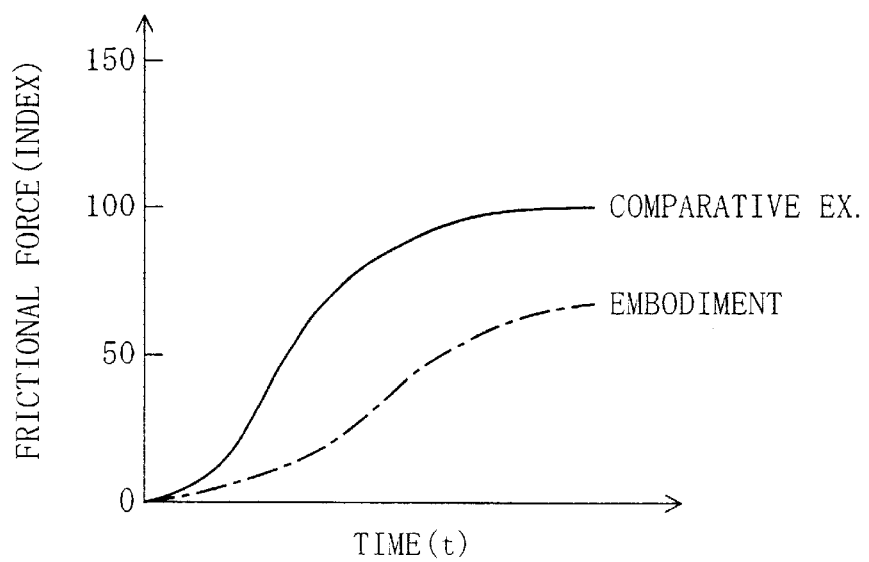
FIG. 15 is a graphic representation of performance comparison of the inventive and comparative V-ribbed belts with reference to frictional forces under water-inpouring conditions.

As shown in FIG. 14, the test results showed that the V-ribbed belt 10 in this embodiment was about 25% smaller in frictional force than the comparative example. Further, the same test was conducted under the conditions where water was inpoured between the guide roller 33 and the sample belt 32. The test result showed that, as shown in FIG. 15, the V-ribbed belt 10 in this embodiment was about 30% smaller in frictional force than the comparative example.

Modifications

Figure 16:
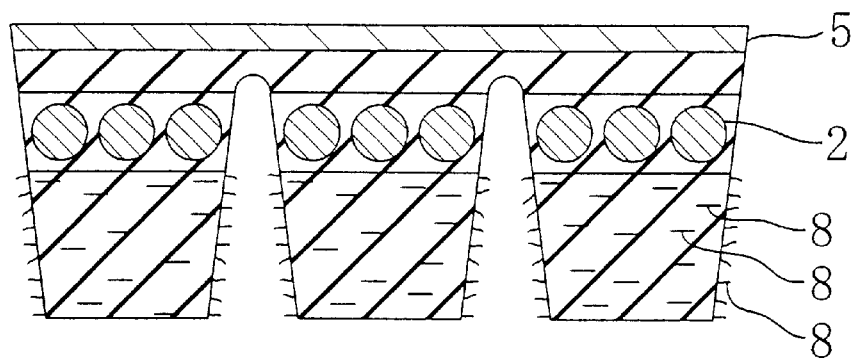
FIG. 16 is a cross-sectional view of a joined V-ribbed belt.
Figure 17:
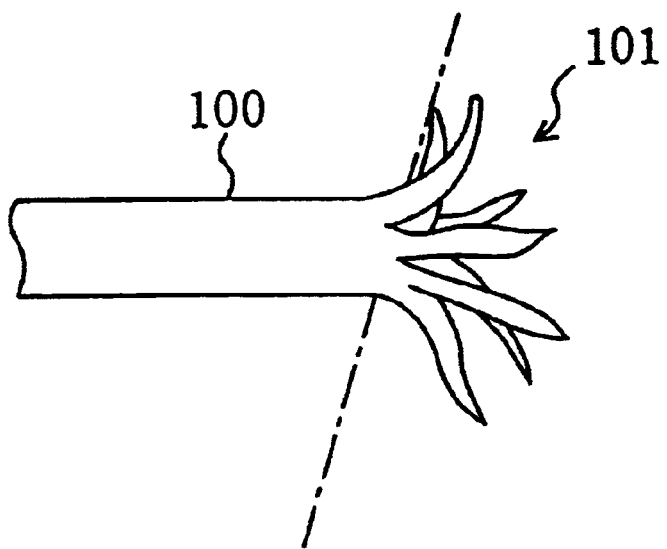
FIG. 17 is a view showing a short fiber of a conventional power transmission belt.

The present invention is not limited to the V-ribbed belts 10 as described in the above embodiments but may be V-ribbed belts of other types. For example, a joined V-ribbed belt 10A as shown in FIG. 16 is also applicable. Further, power transmission belts of other types such as V-belts are also applicable.

What is claimed is:

1. In a method of fabricating a power transmission belt in which some of a crowd of non-aramid synthetic fibers protrude from a surface of a compression rubber, the method comprising:

the step of grinding the compression rubber into which the crowd of non-aramid synthetic fibers is mixed such that the fibers are oriented in a given direction with a grinding wheel having super abrasives protruding by 50 to 95% in grain size thereof from the surface of the grinding wheel.

2. In a method of fabricating a power transmission belt in which some of a crowd of non-aramid synthetic fibers protrude from a surface of a compression rubber, the method comprising:

the step of grinding the compression rubber into which the crowd of non-aramid synthetic fibers is mixed such that the fibers are oriented in a given direction with a grinding wheel having super abrasives the density of which is in the range of 3.5 to 55%.

3. In a method of fabricating a power transmission belt in which some of a crowd of non-aramid synthetic fibers protrude from a surface of a compression rubber, the method comprising:

the step of grinding the compression rubber into which the crowd of non-aramid synthetic fibers is mixed such that the fibers are oriented in a given direction with a grinding wheel having super abrasives protruding by 50 to 95% in grain size thereof from the surface of the grinding wheel and the density of which is in the range of 3.5 to 55%.

* * * * *